(12) United States Patent
Willford et al.

(10) Patent No.: US 10,967,984 B2
(45) Date of Patent: Apr. 6, 2021

(54) HYBRID AIRCRAFT

(71) Applicant: Textron Aviation Inc., Wichita, KS (US)

(72) Inventors: Neal Herbert Willford, Andover, KS (US); Travis Cottrell, Derby, KS (US)

(73) Assignee: Textron Innovations, Inc., Providence, RI (US)

(*) Notice: Subject to any disclaimer, the term of this patent is extended or adjusted under 35 U.S.C. 154(b) by 393 days.

(21) Appl. No.: 15/667,800

(22) Filed: Aug. 3, 2017

(65) Prior Publication Data

US 2018/0037333 A1 Feb. 8, 2018

Related U.S. Application Data

(60) Provisional application No. 62/371,557, filed on Aug. 5, 2016.

(51) Int. Cl.
| | | |
|---|---|---|
| *B64D 35/04* | (2006.01) |
| *B64D 27/24* | (2006.01) |
| *B64D 27/10* | (2006.01) |
| *F01D 15/10* | (2006.01) |
| *F02K 5/00* | (2006.01) |
| *F02C 6/20* | (2006.01) |
| *B64D 27/02* | (2006.01) |

(52) U.S. Cl.
CPC ............ B64D 35/04 (2013.01); B64D 27/10 (2013.01); B64D 27/24 (2013.01); F01D 15/10 (2013.01); F02C 6/206 (2013.01); F02K 5/00 (2013.01); *B64D 2027/026* (2013.01); *B64D 2221/00* (2013.01); *F05D 2220/323* (2013.01); *F05D 2220/76* (2013.01)

(58) Field of Classification Search
CPC ........ B64D 35/04; B64D 27/10; B64D 27/24; B64D 2221/00; B64D 2027/026; F01D 15/10; F05D 2220/76; F05D 2220/323; F02C 6/206; F02K 5/00
See application file for complete search history.

(56) References Cited

U.S. PATENT DOCUMENTS

| 3,937,424 A | 2/1976 | Meier et al. |
| 6,237,874 B1 * | 5/2001 | Rutherford ............ B64D 15/14 244/134 D |

(Continued)

FOREIGN PATENT DOCUMENTS

| DE | 102010021026 A1 | 11/2011 |
| WO | 2016009824 A1 | 1/2016 |
| WO | 2017009037 A1 | 1/2017 |

OTHER PUBLICATIONS

Madavan et al. "A NASA Perspective on Electric Propulsion Technologies for Commercial Aviation" (Year: 2016).*

(Continued)

Primary Examiner — Assres H Woldemaryam
(74) Attorney, Agent, or Firm — Erise IP, P.A.

(57) ABSTRACT

An aircraft where an engine creates mechanical energy. That energy is then converted into another transmittable form, e.g., electrical using a generator, or hydraulic using a pump, and is delivered to remotely-located motors and thrusters, e.g., propellers at one or more locations on the aircraft. The general concept makes the engine as well as the motors used scalable to accomplish overall efficiency objectives.

19 Claims, 8 Drawing Sheets

(56) References Cited

U.S. PATENT DOCUMENTS

| | | | | |
|---|---|---|---|---|
| 6,382,556 | B1* | 5/2002 | Pham | B64C 27/28 244/6 |
| 6,568,633 | B2 | 5/2003 | Dunn | |
| 9,102,326 | B2* | 8/2015 | Anderson | B64D 27/24 |
| 10,414,488 | B2* | 9/2019 | Prager | B64D 1/12 |
| 2003/0075643 | A1 | 4/2003 | Dunn | |
| 2008/0121755 | A1* | 5/2008 | Bennett | B64C 39/024 244/59 |
| 2010/0230547 | A1* | 9/2010 | Tayman | B64C 27/24 244/7 C |
| 2011/0260462 | A1* | 10/2011 | Vander Lind | A63H 27/002 290/55 |
| 2012/0209456 | A1* | 8/2012 | Harmon | B64C 39/024 701/3 |
| 2013/0147204 | A1* | 6/2013 | Botti | B64D 27/24 290/1 A |
| 2014/0158815 | A1* | 6/2014 | Renteria | B64C 29/0025 244/12.1 |
| 2014/0366547 | A1* | 12/2014 | Kraft | F02C 7/224 60/772 |
| 2015/0013306 | A1* | 1/2015 | Shelley | F02K 5/00 60/224 |
| 2015/0014479 | A1* | 1/2015 | Bayliss | H02J 4/00 244/58 |
| 2015/0028151 | A1* | 1/2015 | Bevirt | B64C 29/0025 244/6 |
| 2015/0266571 | A1* | 9/2015 | Bevirt | B64D 27/24 244/7 C |
| 2016/0137304 | A1* | 5/2016 | Phan | B64D 27/02 244/17.23 |
| 2016/0221683 | A1* | 8/2016 | Roberts | B64D 27/02 |
| 2017/0129617 | A1* | 5/2017 | Shah | B64D 27/24 |
| 2017/0320570 | A1* | 11/2017 | Horn | B64C 29/02 |

OTHER PUBLICATIONS

Cizmas, "Analysis of the Effects of Methane Ingestion on Turboshaft Engines" (Year: 2015).*

Torenbeek (doc. 'An appreciation of subsonic engine technology') (Year: 1982).*

PCT Patent Application PCT/US2017/045246 International Search Report and Written Opinion dated Oct. 25, 2017.

European Patent Application 17837664.6 Extended Search Report dated Feb. 3, 2020.

* cited by examiner

HYBRID AIRCRAFT

CROSS-REFERENCE TO RELATED APPLICATIONS

This application claims the benefit of U.S. Provisional Patent Application No. 62/371,557 filed Aug. 5, 2016, the entire contents of which are hereby incorporated by reference.

BACKGROUND OF THE INVENTION

1. Field of the Invention

The invention relates generally to the field of powering aircraft. More specifically, the invention relates to the incorporation of powering an aircraft using an engine that is used to generate electrical power for the purpose of driving the aircraft.

2. Description of the Related Art

Conventional aircraft typically use either piston or turbine power at each propeller, ducted fan, or other propulsion-creating device to propel the aircraft. Electrically powered aircraft are also known. Typically driven by battery power, these aircraft use some form of electric motor to cooperate with the batteries. See, e.g., U.S. Pat. No. 3,937,424 issued to Meier et al. These sorts of aircraft, however, have limited range (due to lack of battery capacity), and the batteries can create weight issues and tend to be inefficient when viewed in terms of their weight versus the thrust provided over time.

SUMMARY

In one embodiment, a system is disclosed for aircraft. More specifically, the system has an engine configured to create mechanical energy;
a conversion device configured to convert the mechanical energy created by the engine into a transmittable form; and a first remotely-located motor, where the first remotely-located motor is configured to receive the form of energy from the conversion device and rotate a first thrust-creating device. In some embodiments, the conversion device is an electric generator. In other embodiments, the engine is a turbine. In some embodiments, the transmittable form of power is electricity. In some embodiments, the first remotely located motor is an electrical motor. The first thrust-creating device can be, in embodiments, one of a propeller and a ducted fan. In some embodiments, the first remotely located motor is not mechanically linked to the engine.

In some broad respects, the engine is a turbine that is rated at between 500 HP and 2000 HP (373-1492 KW). In some embodiments, the engine is a turbine that is rated between 1000 HP (746 KW) and 1500 HP (1,119 KW). In some more specific embodiments, the engine is a turbine that is rated at about 1,300 HP (970 KW).

In some embodiments, the first remotely-located motor and first thrust-creating device are mounted at the aft of the aircraft on a vertical stabilizer. Alternatively, the first remotely-located motor and first thrust-creating device are mounted at the nose of the aircraft.

In some embodiments, a second remotely-located motor, the second remotely-located motor configured to receive the form of power from the conversion device and rotate a second thrust-creating device. In some more specific embodiments, the first remotely-located motor and first thrust-creating device are mounted on a first wing on a first side of the aircraft, and, the second remotely-located motor and second thrust-creating device are mounted on a second wing on an opposite, second side of the aircraft. The first remotely-located motor and first thrust-creating device may be extended out from a first fuselage portion of the aircraft on a first support, and the second remotely-located motor and second thrust-creating device are extended out from an opposite, second fuselage portion. The engine is sometimes located in the fuselage in front of a seating area, or alternatively, can located in the fuselage behind the seating area.

A method is also disclosed in embodiments. For example, a method is disclosed that involves: locating an engine in or about a fuselage of the aircraft; operating the engine to create mechanical energy; converting the mechanical energy into one of electrical or hydraulic energy; and; delivering the energy to a first remote motor at a first location where the motor is associated with a first thrust-creating device oriented to propel the aircraft. The method can involve locating second remote motor and second thrust-creating device at a second location such that the first and second motors and thrust-creating devices are symmetrical. The method also might include the steps of: locating symmetrical third and fourth motor and thrust-creating devices at other locations then the first and second motors and thrust-creating devices; and operating the first, second, third, and fourth motors and thrust-creating devices in a manner that is more efficient than another system which includes an engine located at each propeller.

Also, a process is described where a fuel-driven engine and an energy-conversion device are provided on an aircraft. Then, the energy-conversion device is connected to a plurality of spaced-apart motors at a plurality of locations on the aircraft using one of: hydraulic lines and electrical wiring. Also, the motors are configured to operate using energy received from the energy-conversion device and to each drive a thrust-generating device to create thrust. Then, (i) an engine rating; or (ii) the number of motors in the plurality are scaled to optimize fuel efficiency. Additionally, the engine type can be selected for inclusion in the process based on a Specific Fuel Consumption (SPC) value for the engine being lower at a particular horsepower requirement than the SPC for a conventional arrangement.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for establishing a hybrid system in an aircraft in which the location of the power generating component (e.g., turbines) is not necessarily tied to the need for a particular mechanical connection. Conventionally, the engine is mechanically linked to, and located at, each propeller or other device providing thrust. The terms "mechanically linked" as used herein should be interpreted as meaning that the two devices operated cooperatively together do to some mechanical system (e.g., a shared rotating shaft, gears, etc., rather than some other form of connection (e.g., electrical, pneumatic, or hydraulic). The terms "thrust device" or "thruster" as used herein mean any device used to, upon the receipt of energy, create a propulsive force.

The systems herein enable the engine and generator arrangements to be located remotely from the thrust-creating device or devices (e.g., propellers, ducted fans, or other rotating propulsive devices). Further, a single common turbine generator arrangement can be used to power a plurality of thrust-creating devices. Further still, it has been discovered that fuel efficiency can be increased in passenger aircraft if a particularly sized turbine generator (or other line power generation arrangement) is used.

Figure 1A:
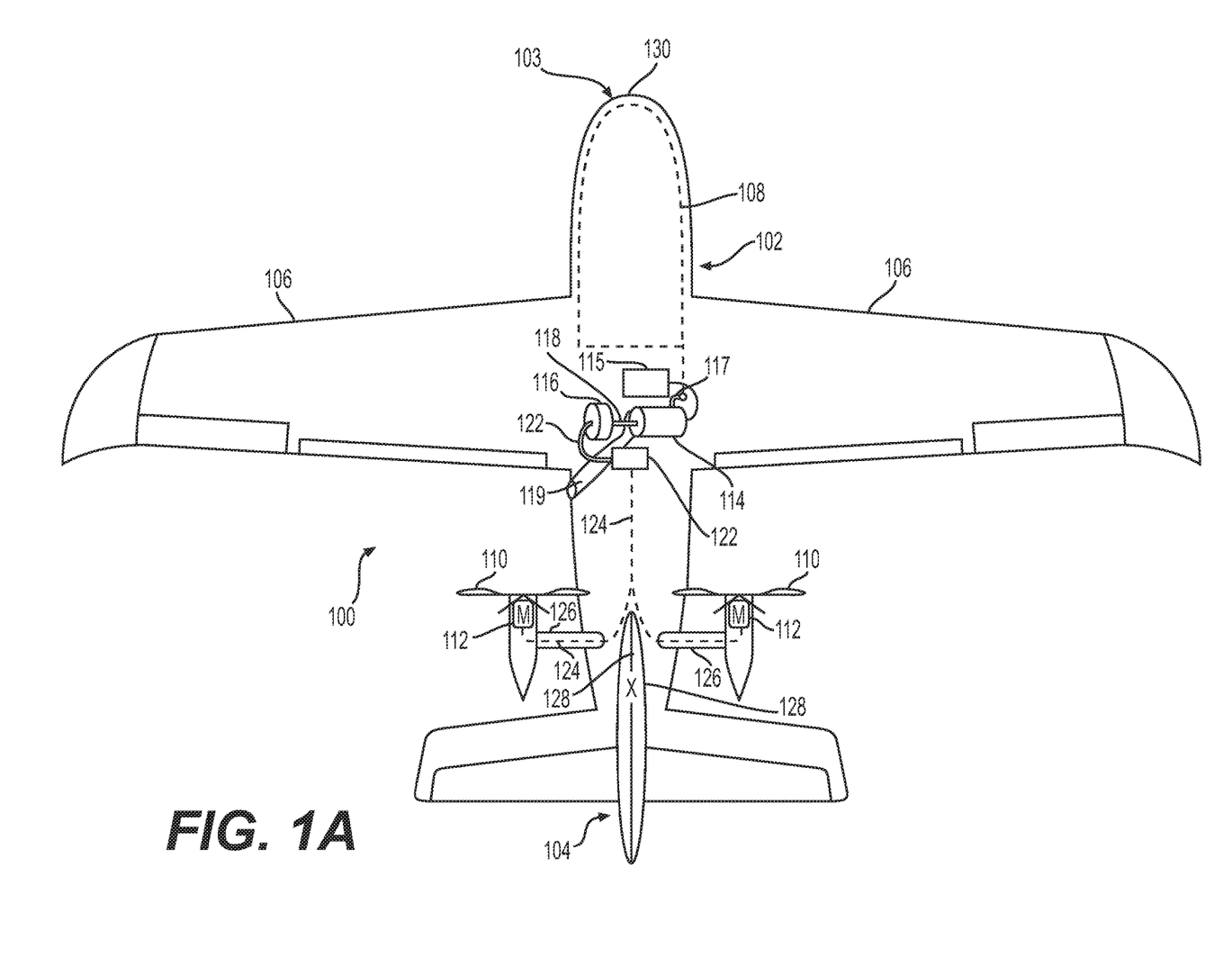
FIG. 1A is a top view of an aircraft in which the power-administering equipment is revealed.
Figure 1B:
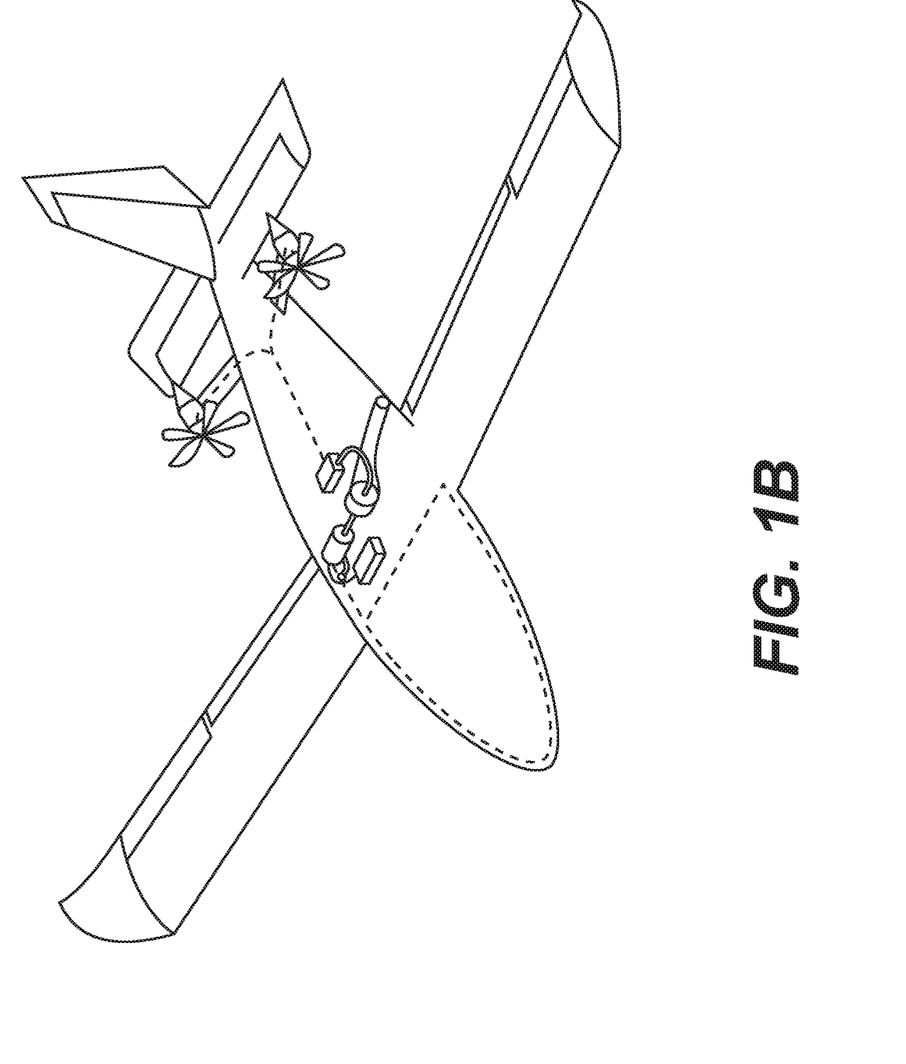
FIG. 1B is a perspective view of the aircraft including the equipment.

Referring first to FIGS. 1A-B, it can be seen that an aircraft 100 has a fuselage portion 102, a forward-most position on the aircraft 130 including a nosecone 103, a tail 104, and wings 106.

Figure 1C:
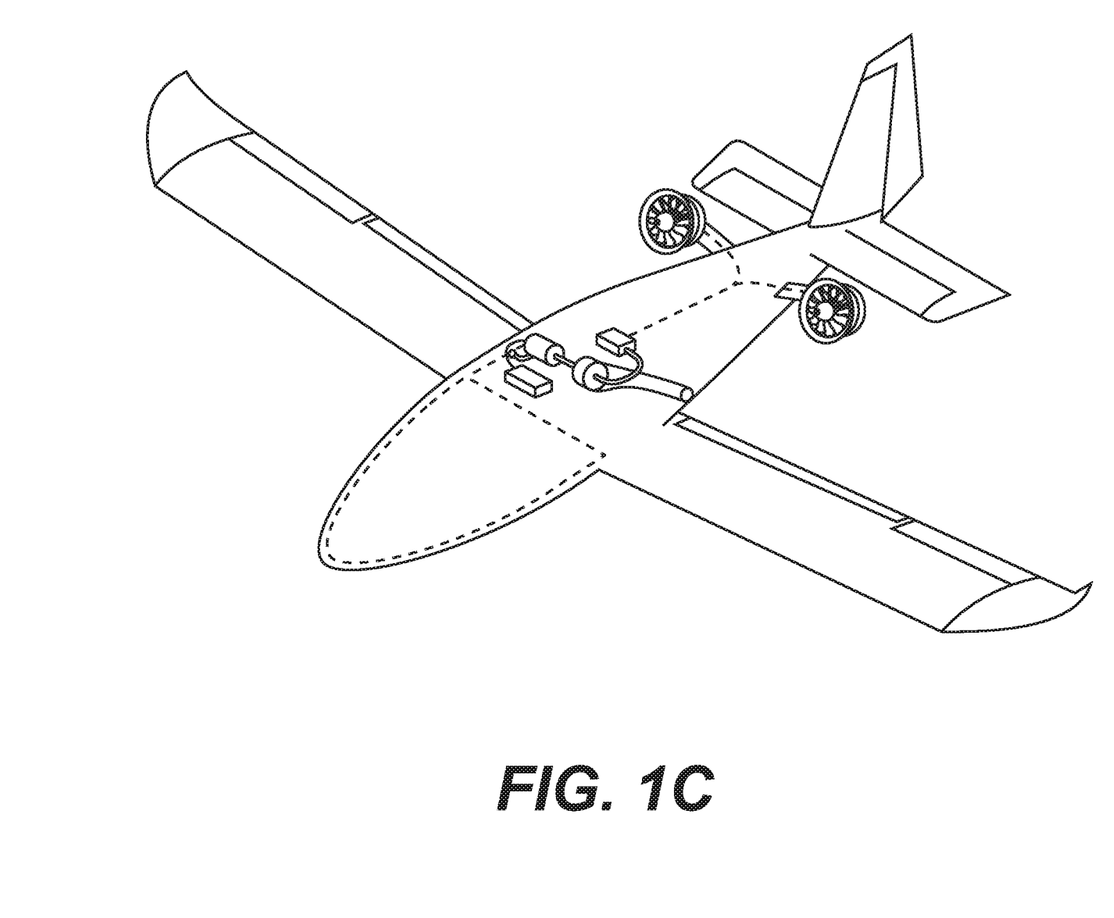
FIG. 1C is a perspective view of an alternative embodiment of the aircraft.

Internally, aircraft 100 includes an inhabited area 108 including seating for the pilot (or pilots) and passengers. In the disclosed embodiment of FIGS. 1A-B, dual propellers 110 are mounted on the exterior of the fuselage 102 behind (and above, although not shown in FIG. 1) the wings 106. FIG. 1C shows an alternative arrangement wherein ducted fans are used instead of propellers. Unless otherwise expressed in the claims, however, the fundamental principles herein should not be limited to any sort of thrust-creating device. It will become evident that numerous other propeller, turbine, and generator arrangements are made possible by the systems disclosed herein, e.g., the arrangements shown in FIGS. 3A-G and others.

The systems of aircraft 100 include a hybrid power system for driving the thrust-creating devices/propellers 110. With the hybrid system, the propellers 110 are driven using electric or hydraulic motors 112. The electric or hydraulic motors 112, in the disclosed embodiment receive power from a power generation system located on board the aircraft 100. More specifically, the system incorporates a turbine engine 114 which receives air from a source, e.g., air intake 117, which is in communication with the aircraft's exterior (e.g., ram air or some other air source may be used). The air received is then directed into a combustion chamber in the turbine 114, mixed with fuel received from a fuel tank 115, and then combustion occurs which is used to drive blades in the turbine to create mechanical energy in shaft 118. Combustion exhaust is then released to the atmosphere via a duct 119 which opens up to the outside of the aircraft.

Although engine 114 in the FIG. 1 embodiment is shown to be a turbine engine, those skilled in the art will recognize that other sorts of engines, e.g., rotary, thermal, piston, or other kinds of engines could be used as well. Thus, the invention should not be limited to any sort of engine unless otherwise stated. The turbine, in the disclosed embodiment, drives a generator 116 using a mechanical connection 118 (which could be a drive shaft). The generator 116 is used to convert the mechanical energy existing in the drive shaft 118 of the engine 114 into electrical or hydraulic energy which will be used to drive the propeller (or propellers) via a motor (or motors).

In the disclosed embodiment, a Permanent Magnet Synchronous Machine (PMSM) generator is used to generate electricity which will be used as the power source for the aircraft. Alternatively, however, other kinds of generators, e.g., Hybrid Excitation Synchronous Machine (HESM) generators, Field Excited Synchronous Generators (FESG), an Induction Generator (IG), other numerous other kinds of AC or DC devices/generators capable of converting mechanical energy into electricity could be used for power creation. Also a possible implementation is one where a pump, fluid medium, and impeller are used instead of an electrical system (this embodiment will be discussed in more detail hereinafter).

Figure 2:
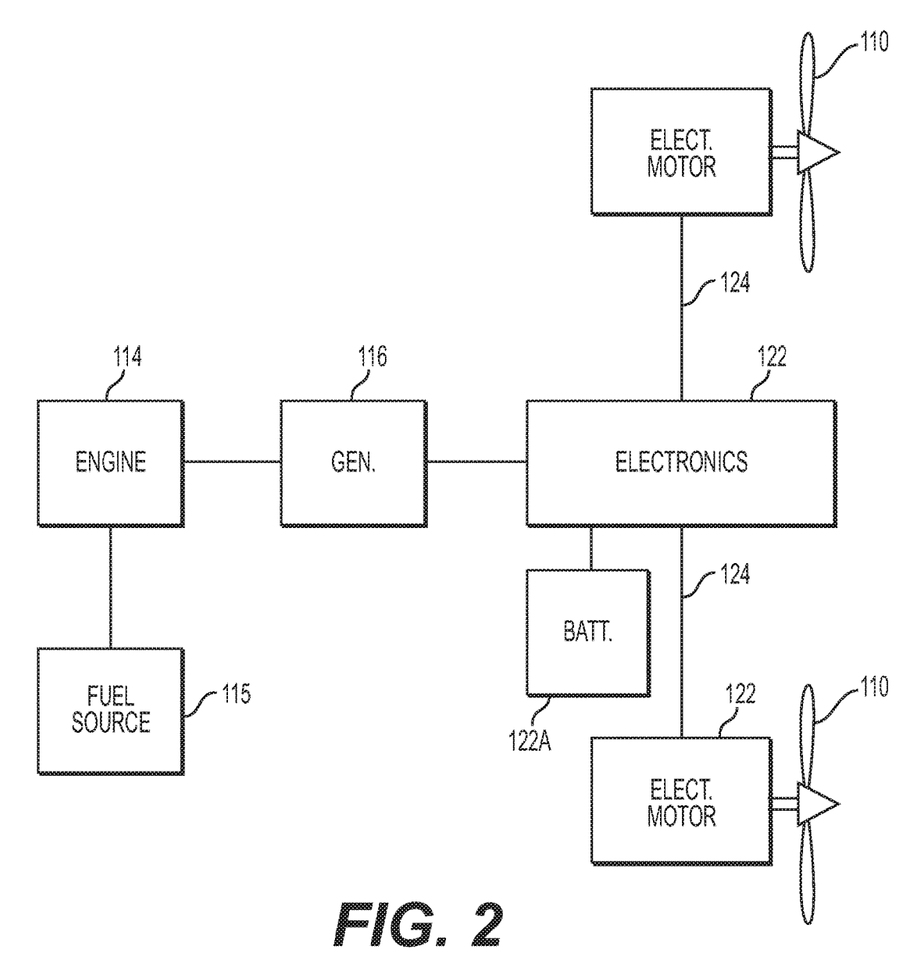
FIG. 2 is a system diagram showing one embodiment for the components incorporated.

The power generated is communicated to an electronics box 122 via an electrical connection 120. A schematic representation of the system is shown in FIG. 2, which shows the incorporation of a battery 122a with the electronics box 122. The electrical connection 120 in the disclosed embodiment can be copper or other wiring of an appropriate gage capable of handling the current generated.

In the electronics box 122, the electrical power, in some embodiments, encounters a charger (not shown) which is used to maintain an electrical charge in battery 122a. Battery 122a, in embodiments, may be coupled with a capacitor (not shown) for the purpose of speeding up power delivery. Additionally, or alternatively, a flywheel (not shown) may be used in cooperation with, or instead of the capacitor and/or battery to enable more immediate power than is afforded by the typical battery.

It should be noted that the electric motors 110 and thrust-creating devices 110 can be operated in a variety of different ways electrically. For example, in a first mode, where the engine 117 is in operation, the electrical power generated can be delivered directly to the electric motors, and battery is simply maintained at charge, and not drained. In a second mode, the engine 117 also being in operation, a portion of the power to the electric motors 110 can be delivered live form the engine 117, and that power delivered can be bolstered by a second portion delivered by draining the batteries. In a third mode, the aircraft could be operated solely on battery power, e.g., when the engine 117 is not in operation.

Regardless of source, power made available from the engine directly or the batteries is converted back into AC (by a converter or inverter) to drive the electric motors 112, which are electrically connected through an electrical connection 124. Although the disclosure above incorporates the use of an AC motor for the purpose of driving each propeller, it should also be noted that a DC motor could be used instead. Doing so would involve the use of some, and also possibly require different electrical equipment within the electronics box 122, e.g., you would not need a converter or inverter.

The electric motors 112 and propellers 110 are, in the FIG. 1 embodiment, extended up and out relative to the fuselage 102 using twin structural engine supports 126.

Figure 4:
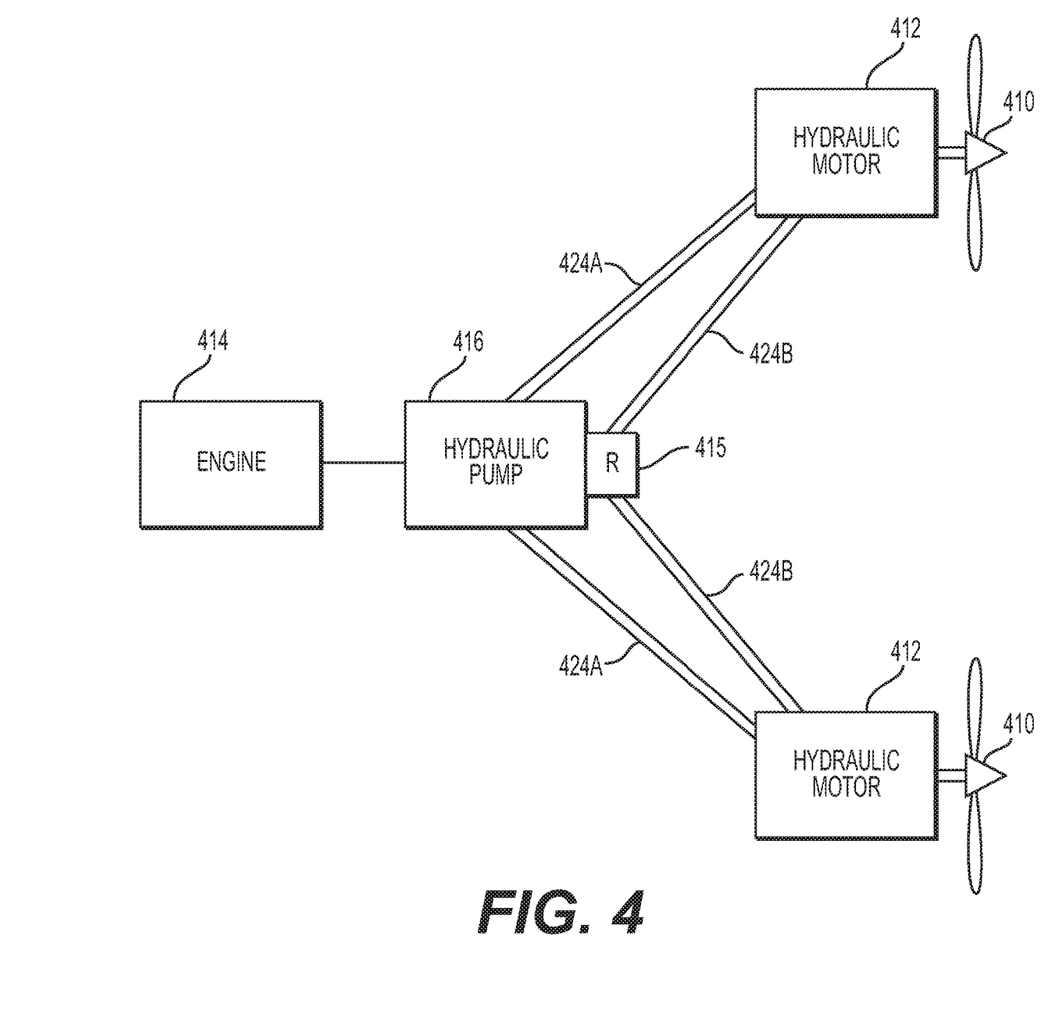
FIG. 4 is a system diagram showing an alternative hydraulic embodiment.

In alternative arrangements, hydraulic systems could be used to power the propellers instead of using electrical power. An example of a hydraulic arrangement is shown in FIG. 4. In this arrangement, the generator 116 of FIG. 1 has been replaced with a hydraulic pump 416 to create a flow of a fluid medium, e.g., hydraulic fluid, through at least one high-pressure transmission line, e.g., lines 424a. Two lines 424a are shown in FIG. 4. Transmission lines 424a each cooperate with a return line (lines 424b shown in the figure) to operate each of the hydraulic motors 412 (which have been substituted for the electric motors in FIGS. 1-2). Motors 412 each drive one of two thrusting devices (propellers 410). Thus, the hydraulic transmission and return lines 424a and 424b (normally hoses or other conduits) are in a sense a substitution for the electrical lines 124 of FIGS. 1 and 2. The hydraulically-driven motors 412 each receive high pressure fluid via the transmission lines 424a, convert it to mechanical energy to turn the thrust-creating devices/propellers 410, and return the fluid (at relatively low pressure) back to a reservoir 415 for recirculation by the hydraulic pump 416. Thus, a hydraulic system could be used instead of the electrical one discussed already to enable the remote powering of the propellers using a common pump. Or alternatively, two pumps could be used (not shown), each one dedicated to, but remotely located from, each hydraulic motor.

In other embodiments, the propeller positions are different than what is shown in the arrangement of FIG. 1. Numerous other possibilities exist. For example, the two propellers could be replaced or supplemented with a propeller located at a position 128 facing forward from the tail of the aircraft. Alternatively, the two propellers could be replaced or supplemented with a propeller located at the front of the aircraft at a location 130. It should also be noted that any combination of fuselage, tail, or nose mounted motor/propeller combinations could be made.

Numerous alternative arrangements for locations of propellers and engines are depicted in FIGS. 3A-G. It should be recognized that the illustrated arrangements shown are only examples, and no particular propeller location, or combination of locations should be considered limiting unless otherwise specified in the claims.

Figures 3A, 3B, 3C, 3D, 3E, 3F, 3G:
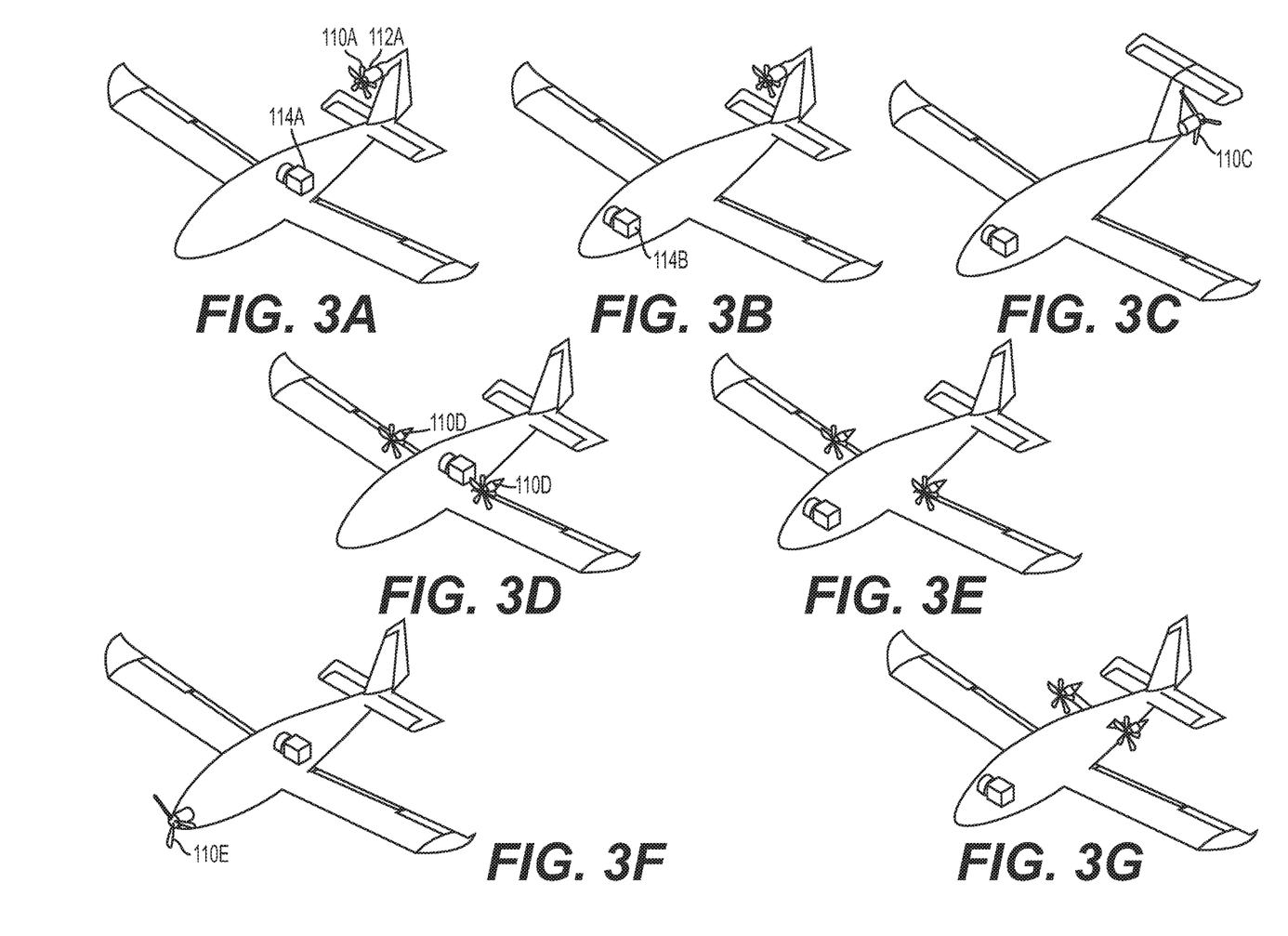
FIGS. 3A-G are drawings showing numerous alternative configurations for an aircraft in which the disclosed systems are incorporated.

Referring first to FIG. 3A, a first non-limiting arrangement is shown where the turbine-generator equipment 114a is located immediately behind the aircraft passenger cabin. In this same figure, a forward-facing propeller 110a and a motor 112a are mounted at the aft of the aircraft on top of a vertical stabilizer as shown.

FIG. 3B shows similar propeller arrangement as the one shown in FIG. 3B, but the turbine-generator arrangement 114b has been moved to forward location in the aircraft in front of (or immediately below) the pilots and passengers. This more forward location enables the aircraft designer to modify the location of the turbine-generator such that the center of gravity is established in a most desirable location. With conventional aircraft, because the power-generating equipment had to be located at the propellers, this was impossible.

It should also be noted that in embodiments, the turbine equipment should be provided on tracks, or with some other arrangement enabling the turbine to be manually or automatically moved fore or aft to reach a desired location which is most advantageous regarding the center of gravity, depending on passenger or cargo loading.

FIG. 3C shows an arrangement where the propeller 110c (and electric motor) are at the rear of the aircraft where the vertical and horizontal stabilizers meet. Propeller 110c rotates and has pitch angles that create thrust in the same direction as the other propellers, and thus, compels the aircraft forward just like with the other propellers disclosed.

FIG. 3D discloses an arrangement where two symmetrical propellers 110d are mounted on and extend up from the upper surfaces of the wings, and FIG. 3E shows a similar arrangement except that the turbine-generator arrangement has been moved forward (in embodiments, for the purpose of manipulating the aircraft center of gravity).

In FIG. 3F, a propeller 110e is mounted at the nose of the aircraft. The propeller arrangement in FIG. 3G is similar to the one shown in FIG. 1, but shows how the turbine-generator locations can be moved around inside the aircraft.

It should be understood that the use of electrical power provided by an engine and generator to drive a remotely located propeller (or propellers) enables the freedom to locate all of these components without structural restrictions that resulted from the conventional need to mechanically link the mechanical rotational energy directly with the propeller.

Another important aspect of this arrangement is that engine speed is not determinative of the motor/propeller speeds. This is because the electrical power generated can be stored and delivered when ideal—a benefit not allowed by the prior art devices.

Fuel efficiency can also be a benefit of the arrangements discussed above.

For example, it has been discovered that the power arrangements disclosed herein can actually improve fuel consumption efficiencies over the conventional directly mechanically linked sorts of turbine engines, depending on the size of the engine used (e.g., 13-20% in fuel savings depending on size). Generally speaking, these savings are size dependent. More specifically, smaller engines will tend to be less efficient using the arrangements disclosed herein as opposed to the conventional arrangements where the engines are mechanically linked to the propellers (due to thermodynamic scaling inefficiencies). But where engine size is increased, the hybrid arrangement, e.g., a single turbine/generator used to remotely power a plurality of electrically-driven propellers, can save fuel.

One reason for this is the scalability afforded. For example, in evaluating a conventional mechanical arrangement, the number of thrust-creating devices (propellers or ducted fans) matched up with each (or the only) engine can be increased easily in the interest of finding the most efficient arrangement.

Further, engine rating can also be recognized in determining whether the electrically based arrangements disclosed herein are more efficient or not. For aircraft, these fuel efficiency benefits have been found to be the greatest where the engine set (turbine/generator) is at least rated at between 500 HP-2000 HP (373-1492 KW). These efficiencies have proven to be even greater where the turbine/generator is rated at between 1000 HP (746 KW) and 1500 HP (1,119 KW). And ideally, maximum efficiency can be obtained at an engine size of about 1,300 HP (970 KW). Thus, by manipulating engine size, fuel efficiencies can be significantly improved by implementing a hybrid electric arrangement.

Using a 1000 HP rated turbine as an example, were this turbine to be coupled with two 500 HP electric motors, e.g., in an arrangement like the one shown in FIGS. 1-2, the overall fuel efficiency would be appreciably greater than where two independent 500 HP turbines were used, each being located at, and mechanically linked to drive one of the independent propellers 110. In this conventional arrangement, each 500 HP turbine would be substituted into the locations of the electric motors 112 and drive the shafts on which the propellers rotate.

Figure 5:
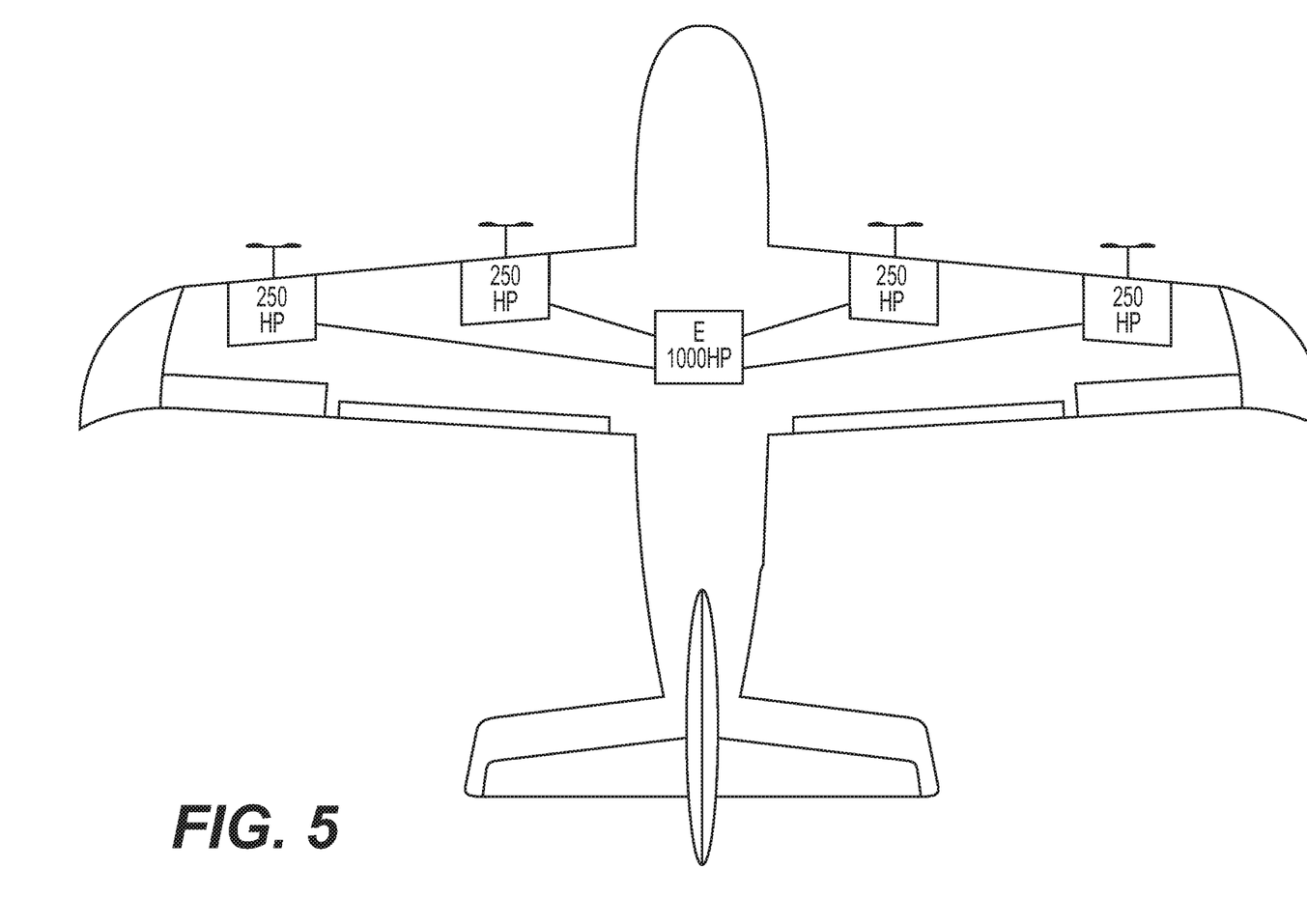
FIG. 5 is a schematic showing a scaled variation enabled by the concepts disclosed.

Other arrangements are possible. For example, rather than the symmetrical pair of electric motors shown in FIGS. 1 and 2, the single turbine concept could be incorporated into an arrangement (See FIG. 5) where each wing supported two spaced-apart motors and propellers—thus, resulting in a total of four motors and propellers. Again, assuming the single turbine was rated at 1000 HP, each electric motor would be rated at 250 HP. In this instance, the overall fuel efficiency would again be greatly improved over conventional systems having four mechanically-linked turbines, each devoted to a propeller.

Figure 6:
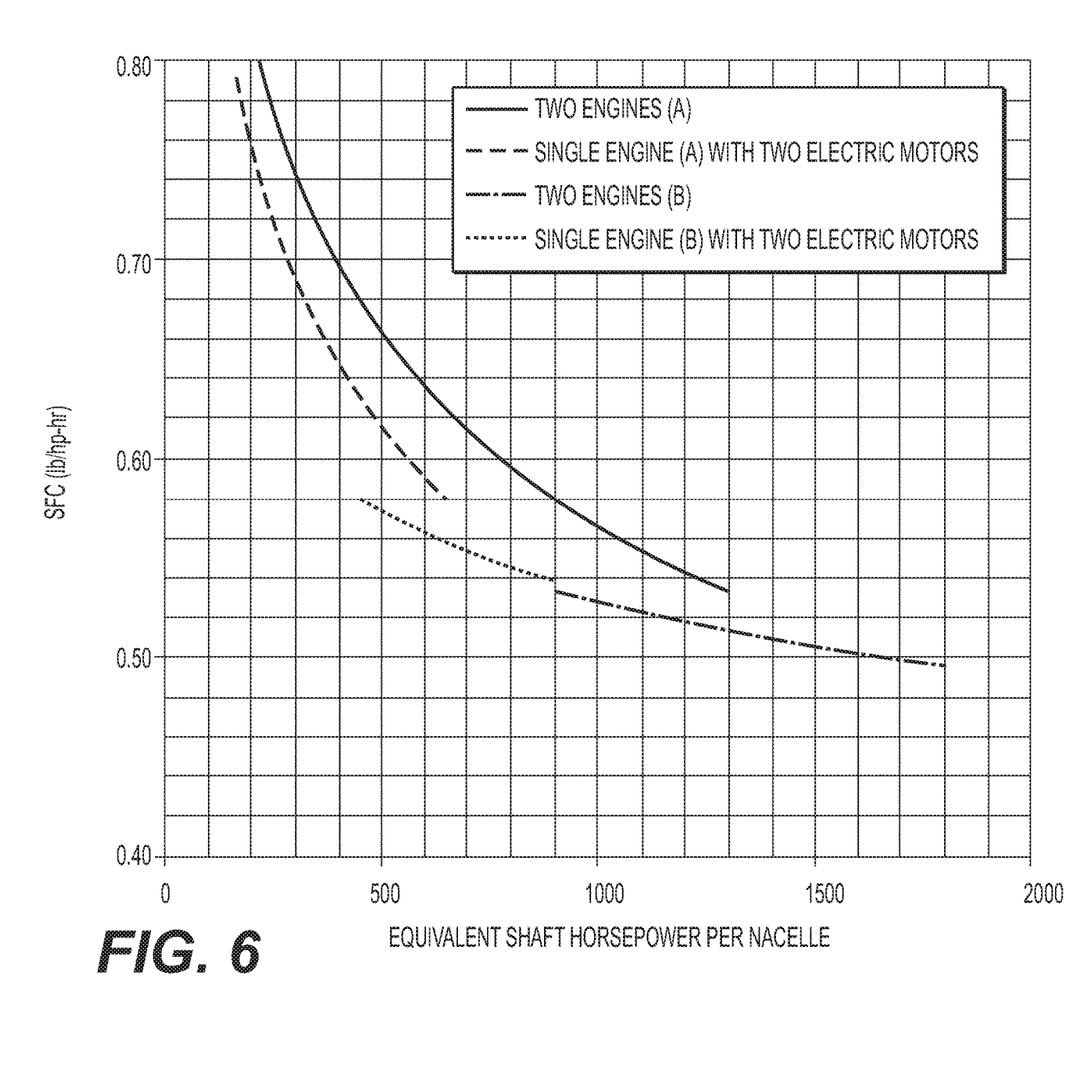
FIG. 6 is a chart showing values for Specific Fuel Consumption (SFC) in lb/HP-HR against equivalent shaft horsepower per nacelle for different engine types.

The chart shown in FIG. 6 illustrates that fuel efficiency can be increased by substituting a single engine (e.g., a turbine in the figures) for a plurality of engines, one located at each propeller in the conventional sense. FIG. 6 plots values for Specific Fuel Consumption (SFC) in lb/HP-HR against equivalent shaft horsepower per nacelle for two engine types—engine type "A" and engine type "B". The SFC values have been generated to reflect typical trends for turbine engines, and are not based on actual trials. Engine type "A", in the FIG. 6 embodiment, is a particular type of turbine, and one line represents the SFC where two of the engines are installed as is conventional, with each located and physically connected with the propulsion mechanism (e.g., propeller). A second line shows the SFC for an arrangement like the ones shown in FIGS. 1-2 and 4 where a larger single engine is used to drive electric motors located at each propeller. Similar comparisons are made of engine type "B". Referencing the two curves for the results obtained for engine type "A", it can be seen that for an equivalent shaft horsepower per nacelle of 500 HP, the SFC for the conventional arrangement is slightly over 0.66 whereas the SFC for the hybrid arrangement, e.g., like the ones shown in FIGS. 1-2 and 4 is just below 0.62. It is also evident from the chart that the fuel savings will be dependent on the engine type. For example, the performance appreciation for engine "A" is greater than that for engine type "B".

It should be understood, that although the fuel efficiency benefits are not recognized outside of the ranges in engine size provided above (in HP and/or KW ratings), that there can be numerous other advantages provided by the lack of need for a mechanical link.

Where conventional aircraft systems include arrangements where a turbine, piston (or other sort of) engine must be physically located at, mechanically connected to, and specifically dedicated to each propeller, the arrangements disclosed herein are not so bound.

With the power system disclosed herein, the need for a mechanical connection (or link) existing between the engine and the propellers is removed. And the new arrangement also eliminates the need for the engine to be located near the propellers. This layout also enables the following advantages including, e.g., alternative seating arrangements, center of gravity improvements, etc.

Additionally, the removal of a requirement for an existing mechanical link made dynamic connection between the engine and the propeller (or propellers) allows the engine 114 to be oriented an any position relative to the propeller axes. Conventionally aircraft engines have been oriented so that the drive shaft of the engines is parallel with the longitudinal axis of the fuselage (which is also parallel to the flight path of the aircraft). As can also be seen from FIGS. 1A-C, however, the engine 114, drive shaft 118, and generator 116 used for power generation in the aircraft 100 are all oriented in an axis which is axially transverse relative to the center axis of the fuselage.

It is also significant that a single engine can be used to power a plurality of propellers. Thus, the propellers can be located completely independent from the need to create a mechanical link between the drive mechanisms of the engine with the propellers. Only the electric motors need to be located at the propellers, and the electronic motors are significantly smaller and lighter than the conventional piston or other engines used to power the propellers.

Similarly, although all of the depicted embodiments show the use of motors being located immediately at the locations of the propellers, it is entirely possible for the actual electronic motor to be in a position away from the propeller, but linked by mechanical drive mechanisms (e.g., gears and shafts). Further, although all of the propellers shown in the disclosed embodiments include an electric motor that is coupled with and dedicated to each individual propeller, it is contemplated that alternative arrangements where a single electric motor is provided for a plurality of propellers, which could be achieved via mechanical coupling.

COMBINATION OF FEATURES

Features described above as well as those claimed below may be combined in various ways without departing from the scope hereof. For example, it will be appreciated that aspects of a system or method for analyzing the performance of a wireless network may incorporate or swap features of another system or method for analyzing the performance of a wireless network described herein. The methods for analyzing the performance of a wireless network may incorporate features of systems disclosed herein, and systems for analyzing the performance of a wireless network may incorporate features of the disclosed methods. The following examples illustrate possible, non-limiting combinations of embodiments described above. It should be clear that many other changes and modifications may be made to the systems and methods described herein without departing from the spirit and scope of this invention:

(A1) A system for aircraft, the system comprising: an engine configured to create mechanical energy; a conversion device configured to convert the mechanical energy created by the engine into a transmittable form; a first remotely-located motor, the first remotely-located motor configured to receive the form of energy from the conversion device and rotate a first thrust-creating device.

(A2) In the system denoted as (A1) wherein the conversion device is an electric generator.

(A3) In either of the systems denoted as (A1) or (A2), wherein the engine is a turbine.

(A4) In any of the systems denoted as (A1) through (A3) wherein the transmittable form of power is electricity.

(A5) In any of the systems denoted as (A1) through (A4) wherein the first remotely located motor is an electrical motor.

(A6) In any of the systems denoted as (A1) through (A5) wherein the first thrust-creating device is one of a propeller and a ducted fan.

(A7) In any of the systems denoted as (A1) through (A6) wherein the first remotely located motor is not mechanically linked to the engine.

(A8) In any of the systems denoted as (A1) through (A7) wherein the engine is a turbine that is rated at between 500 HP and 2000 HP (373-1492 KW).

(A9) In any of the systems denoted as (A1) through (A7) wherein the engine is a turbine that is rated between 1000 HP (746 KW) and 1500 HP (1,119 KW).

(A10) In any of the systems denoted as (A1) through (A7) wherein the engine is a turbine that is rated at about 1,300 HP (970 KW).

(A11) In any of the systems denoted as (A1) through (A10) wherein the first remotely-located motor and first thrust-creating device are mounted at the aft of the aircraft on a vertical stabilizer.

(A12) In any of the systems denoted as (A1) through (A10) wherein the first remotely-located motor and first thrust-creating device are mounted at the nose of the aircraft.

(A13) In any of the systems denoted as (A1) through (A12) wherein the system further comprises: a second remotely-located motor, the second remotely-located motor configured to receive the form of power from the conversion device and rotate a second thrust-creating device.

(A14) In any of the systems denoted as (A1) through (A13) wherein the first remotely-located motor and first thrust-creating device are mounted on a first wing on a first side of the aircraft, and, the second remotely-located motor and second thrust-creating device are mounted on a second wing on an opposite, second side of the aircraft.

(A15) In any of the systems denoted as (A1) through (A14) wherein the first remotely-located motor and first thrust-creating device are extended out from a first fuselage portion of the aircraft on a first support, and the second remotely-located motor and second thrust-creating device are extended out from an opposite, second fuselage portion.

(A16) In any of the systems denoted as (A1) through (A15) wherein the engine is located in the fuselage in front of a seating area.

(A17) In any of the systems denoted as (A1) through (A15) where the engine is located in the fuselage behind a seating area.

(B1) A method of propelling an aircraft, the method comprising: locating an engine in or about a fuselage of the aircraft; operating the engine to create mechanical energy; converting the mechanical energy into one of electrical or hydraulic energy; and; delivering the energy to a first remote motor at a first location, the motor associated with a first thrust-creating device oriented to propel the aircraft.

(B2) In the method denoted as (B1): locating second remote motor and second thrust-creating device at a second location such that the first and second motors and thrust-creating devices are symmetrical.

(B3) In any of the methods denoted as (B1) through (B2), the method comprising: locating symmetrical third and fourth motor and thrust-creating devices at other locations then the first and second motors and thrust-creating devices; and operating the first, second, third, and fourth motors and thrust-creating devices in a manner that is more efficient than another system which includes an engine located at each propeller.

(C1) A process comprising: providing a fuel-driven engine and an energy-conversion device on an aircraft; connecting the energy-conversion device to a plurality of spaced-apart motors at a plurality of locations on the aircraft using one of: hydraulic lines and electrical wiring; configuring the motors to operate using energy received from the energy-conversion device and to each drive a thrust-generating device to create thrust; and scaling: (i) an engine rating; and (ii) a number of motors in the plurality; to optimize fuel efficiency.

(C2) In the process denoted as (C1), the providing step comprising: selecting an engine type for inclusion in the process based on a Specific Fuel Consumption (SPC) value for the engine being lower at a particular horsepower requirement than the SPC for a conventional arrangement.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system of fixed-wing aircraft, the system comprising:
a turbine engine located in the fuselage of the fixed-wing aircraft, the engine configured to create mechanical energy, the engine being rated in-between 500 HP and 2000 HP (373-1492 KW);
a conversion device configured to convert the mechanical energy created by the engine into a transmittable form;
a first motor, the first motor configured to receive the form of energy from the conversion device and rotate a first thrust-creating device, both the first motor and the first thrust-creating device being located remotely relative to the turbine engine.

2. The system of claim 1 wherein the conversion device is an electric generator.

3. The system of claim 1 wherein the transmittable form of power is electricity.

4. The system of claim 1 wherein the first motor is an electric motor.

5. The system of claim 1 wherein the first thrust-creating device is one of a propeller and a ducted fan.

6. The system of claim 1 wherein the first motor is not mechanically linked to the engine.

7. The system of claim 1 wherein the engine is a turbine that is rated between 1000 HP (746 KW) and 1500 HP (1,119 KW).

8. The system of claim 1 wherein the engine is a turbine that has a rating of about 1,300 HP (970 KW) and thus is substantially within the bounds of 1000 HP (746 KW) and 1500HP (1,119 KW).

9. The system of claim 1 wherein the first remotely-located motor and first thrust-creating device are mounted at the aft of the aircraft on a vertical stabilizer.

10. The system of claim 1 wherein the first remotely-located motor and first thrust-creating device are mounted at the nose of the aircraft.

11. The system of claim 1 comprising:
a second remotely-located motor, the second remotely-located motor configured to receive the form of power from the conversion device and rotate a second thrust-creating device.

12. The system of claim 11 wherein the first remotely-located motor and first thrust-creating device are mounted on a first wing on a first side of the aircraft, and, the second remotely-located motor and second thrust-creating device are mounted on a second wing on an opposite, second side of the aircraft.

13. The system of claim 11 wherein the first remotely-located motor and first thrust-creating device are extended out from a first fuselage portion of the aircraft on a first support, and the second remotely-located motor and second thrust-creating device are extended out from an opposite, second fuselage portion.

14. The system of claim 1 wherein the engine contributes to the thrust of the fixed-wing aircraft and is located in front of a seating area in the fuselage.

15. A method of propelling a fixed wing aircraft, the method comprising:
    locating an engine in a fuselage of the fixed wing aircraft;
    configuring the engine to create mechanical energy at a rating between 500 HP and 2000 HP (373-1492 KW);
    converting the mechanical energy into one of electrical or hydraulic energy;
    delivering the energy to a plurality of motors, each motor being associated with a respective thrust-creating device, the thrust-creating devices being remotely and symmetrically located relative to the engine and being oriented to propel the fixed wing aircraft, and
    scaling the motors in the plurality relative to a turbine engine rating such that the overall operational efficiency exceeds that of an alternative sysem wherein the motors are mechanically-linked to the engine.

16. A process comprising:
    providing a fuel-driven engine and an energy-conversion device in the fuselage of a fixed wing aircraft;
    connecting the energy-conversion device to a plurality of motors being spaced apart from the engine at a plurality of locations on the aircraft using one of: hydraulic lines and electrical wiring;
    configuring the motors to operate using energy received from the energy-conversion device and to each drive a thrust-generating device to create thrust; and
    scaling:
    (i) an engine rating, the engine rating being between 500 HP and 2000 HP (373-1492 KW); and
    (ii) a number of motors in the plurality, each motor being rated at a value substantially equal to the engine rating divided by the number of motors;
    to optimize fuel efficiency in an overall fixed-wing aircraft design.

17. The process of claim 16 wherein the providing step comprises:
    selecting an engine type for inclusion in the process based on a Specific Fuel Consumption (SPC) value for the engine being lower at a particular horsepower requirement than the SPC for a conventional arrangement.

18. The system of claim 16 comprising:
    scaling the engine to be rated between 1000 HP (746 KW) and 1500 HP (1,119 KW).

19. The system of claim 17 comprising:
    scaling the engine to be rated at about 1,300 HP (970 KW).

* * * * *